United States Patent
Owen et al.

(10) Patent No.: US 12,259,898 B1
(45) Date of Patent: Mar. 25, 2025

(54) TRANSIENT EXPLORATORY EDITING OF INPUT TABLES ON A DATA WAREHOUSE

(71) Applicant: SIGMA COMPUTING, INC., San Francisco, CA (US)

(72) Inventors: Gregory G. Owen, San Mateo, CA (US); Stipo Josipovic, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/189,030

(22) Filed: Mar. 23, 2023

(51) Int. Cl.
  *G06F 16/00* (2019.01)
  *G06F 16/248* (2019.01)
  *G06F 16/25* (2019.01)
  *G06F 16/28* (2019.01)
  *G06F 40/18* (2020.01)

(52) U.S. Cl.
  CPC .......... *G06F 16/252* (2019.01); *G06F 16/248* (2019.01); *G06F 16/283* (2019.01); *G06F 40/18* (2020.01)

(58) Field of Classification Search
  CPC .... G06F 16/252; G06F 16/248; G06F 16/283; G06F 40/18
  See application file for complete search history.

(56) References Cited

U.S. PATENT DOCUMENTS

| | | | | |
|---|---|---|---|---|
| 11,093,703 B2 * | 8/2021 | Viégas | ............... | G06F 3/0482 |
| 11,354,493 B2 * | 6/2022 | Von Tish | ............ | H04L 67/535 |
| 11,755,829 B1 * | 9/2023 | Naren | .................. | G06F 40/106 |
| | | | | 715/744 |
| 2014/0188575 A1 * | 7/2014 | Welzant | ............ | G06Q 50/205 |
| | | | | 705/7.39 |
| 2014/0279879 A1 * | 9/2014 | McLean | ............ | G06F 16/1824 |
| | | | | 707/612 |
| 2020/0341903 A1 * | 10/2020 | Dobiesz | ................ | G06F 9/451 |
| 2024/0037325 A1 * | 2/2024 | Chen | ..................... | G06F 16/22 |

* cited by examiner

*Primary Examiner* — Alexander Khong

(57) ABSTRACT

Transient exploratory editing of input tables on a data warehouse including: presenting, on a client computing system by a workbook manager, an input table in a cloud-based data warehouse, wherein the input table is presented in an exploration mode that displays edits to the input table without altering the input table in the cloud-based data warehouse; receiving, by the workbook manager, a change to the input table; and modifying, by the workbook manager, a presentation of the input table reflecting the change without modifying the input table in the cloud-based data warehouse.

20 Claims, 7 Drawing Sheets

TRANSIENT EXPLORATORY EDITING OF INPUT TABLES ON A DATA WAREHOUSE

BACKGROUND

Field of the Invention

The field of the invention is data processing, or, more specifically, methods, apparatus, and products for transient exploratory editing of input tables on a data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for transient exploratory editing of input tables on a data warehouse including presenting, on a client computing system by a workbook manager, an input table in a cloud-based data warehouse, wherein the input table is presented in an exploration mode that displays edits to the input table without altering the input table in the cloud-based data warehouse; receiving, by the workbook manager, a change to the input table; and modifying, by the workbook manager, a presentation of the input table reflecting the change without modifying the input table in the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
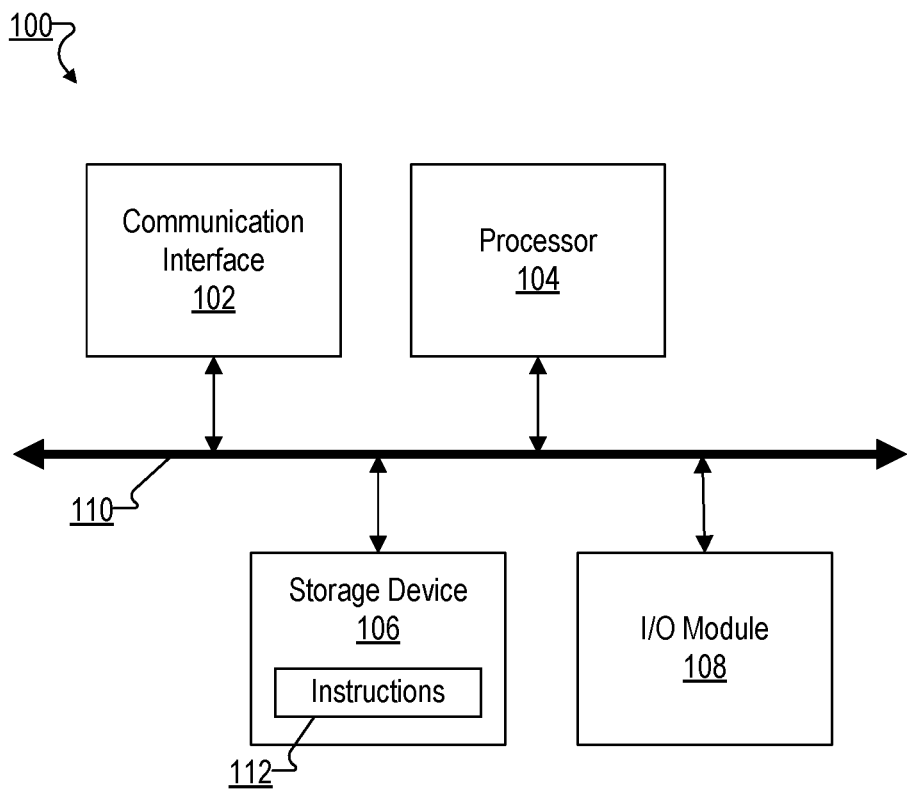
FIG. 1 sets forth a block diagram of an example system configured for transient exploratory editing of input tables on a data warehouse according to embodiments of the present invention.

Example methods, apparatus, and products for transient exploratory editing of input tables on a data warehouse in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
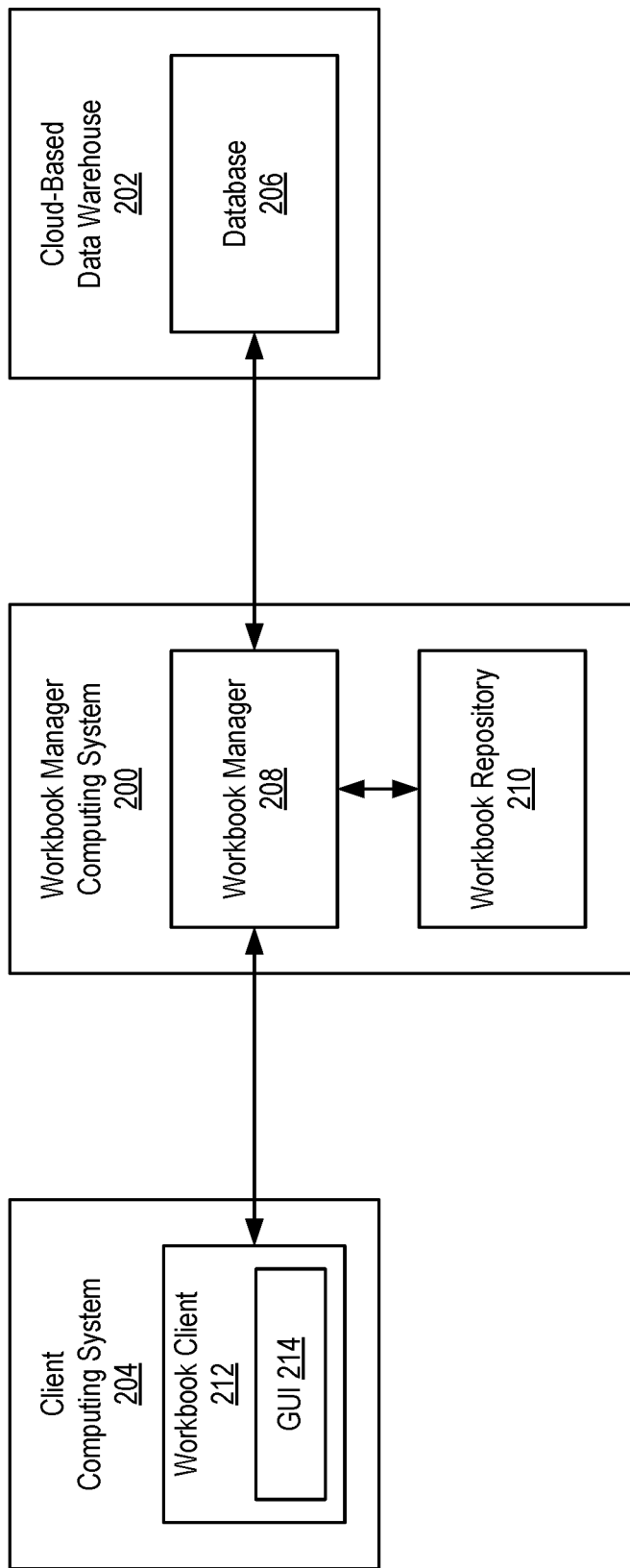
FIG. 2 sets forth a block diagram of an example system configured for transient exploratory editing of input tables on a data warehouse according to embodiments of the present invention.

For further explanation, FIG. 2 illustrates a block diagram depicting an exemplary system for transient exploratory editing of input tables on a data warehouse according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages client data on behalf of the client. The client (e.g., via the client computing system 204) accesses the data via the workbook manager 208, which organizes and analyzes the data as datasets within a workbook. The workbook manager 208 may access the client data from the cloud-based data warehouse 202 using credentials supplied by the client.

A workbook is a presentation of data from a cloud-based data warehouse 202 (e.g., using one or workbook elements). To present data from the cloud-based data warehouse 202, the data is retrieved from the database 206 (e.g., using a database statement) and organized using a dataset. A dataset is a collection of information that resides on the workbook manager computing system 200 that includes instructions for the retrieval and organization of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse. A workbook may include one or more workbook elements. Each workbook element includes a collection of graphical elements and organizing mechanism for a dataset or portion of a dataset. Workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
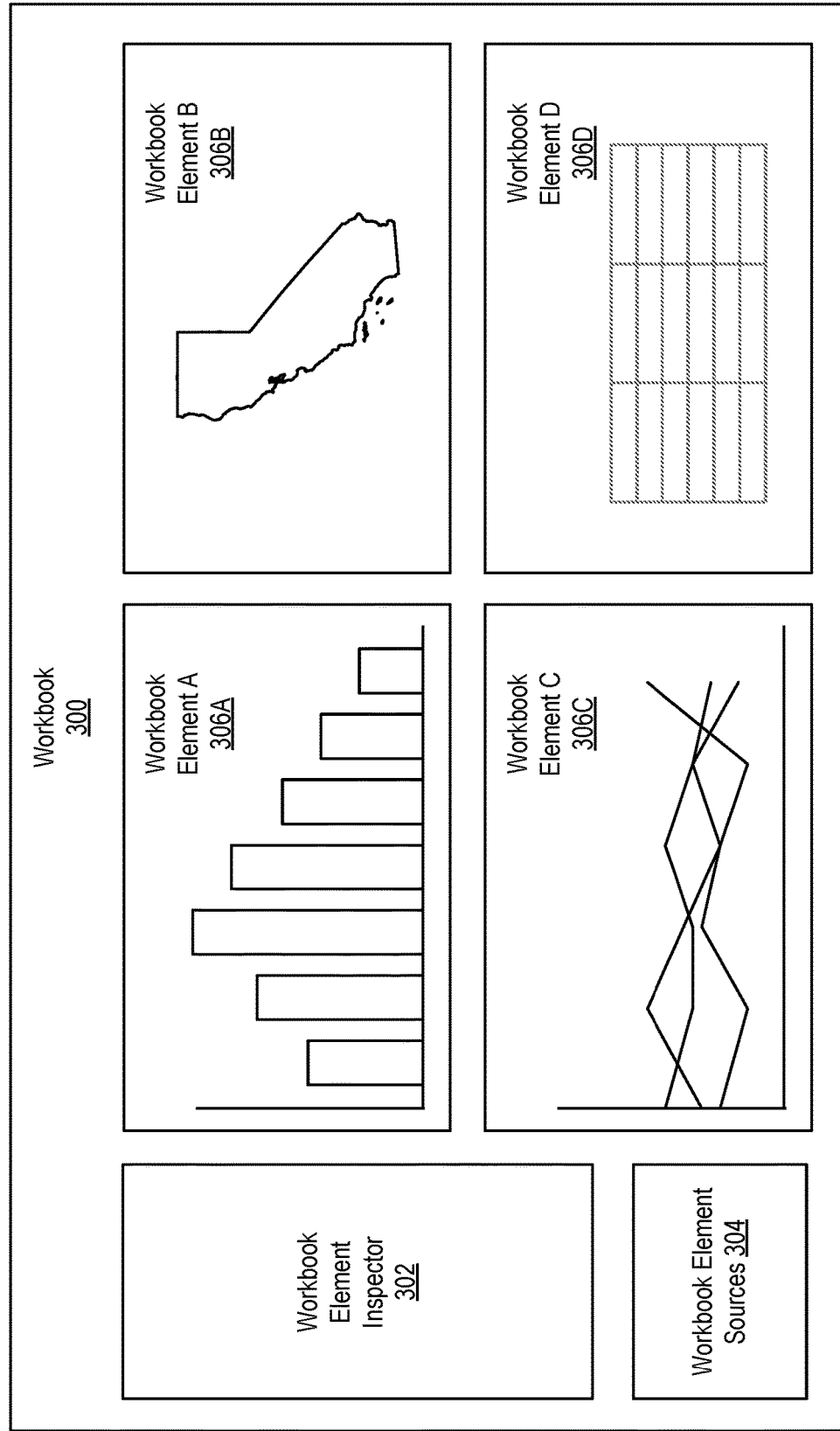
FIG. 3 sets forth a block diagram of an example system configured for transient exploratory editing of input tables on a data warehouse according to embodiments of the present invention.

FIG. 3 shows an exemplary GUI for transient exploratory editing of input tables on a data warehouse according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical element that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
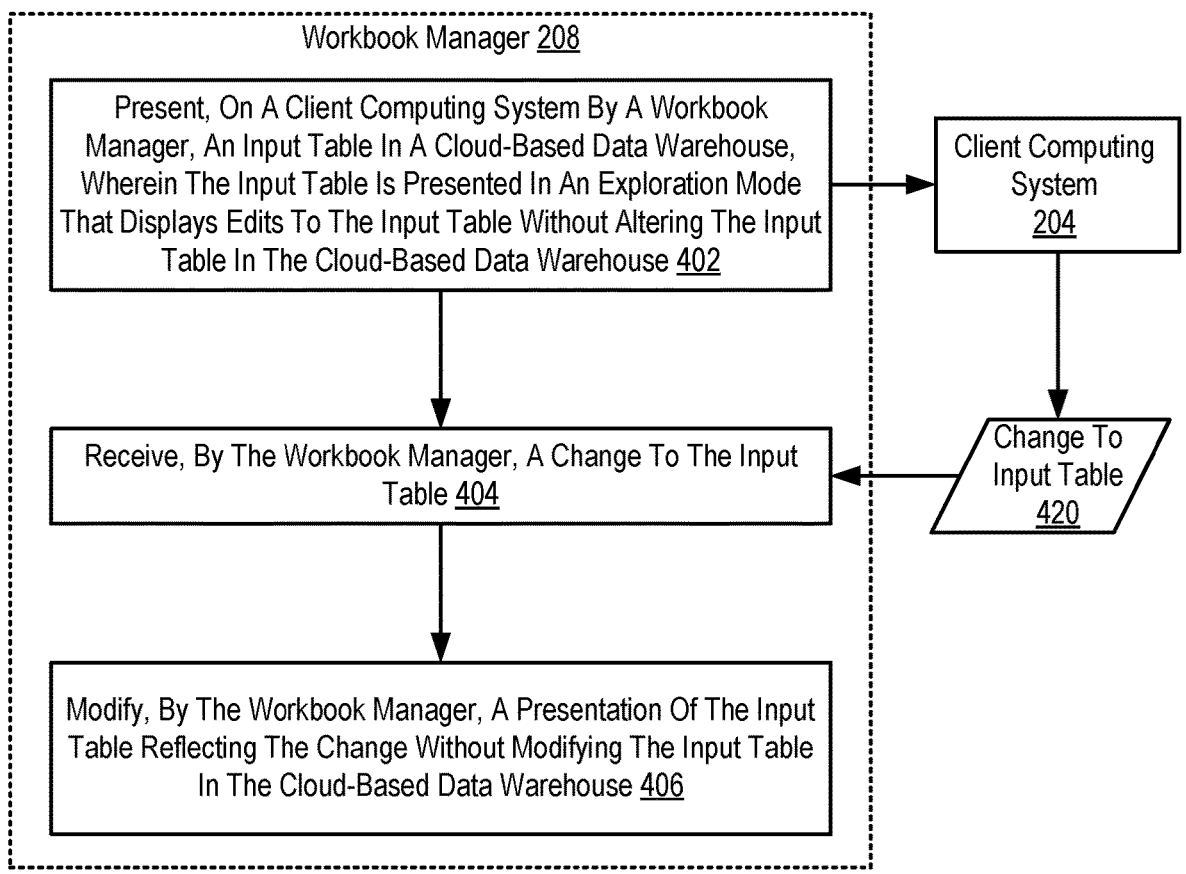
FIG. 4 sets forth a flow chart illustrating an exemplary method for transient exploratory editing of input tables on a data warehouse according to embodiments of the present invention.

For further explanation, FIG. 4 sets forth a flow chart illustrating an exemplary method for transient exploratory editing of input tables on a data warehouse according to embodiments of the present invention. The method of FIG. 4 includes presenting 402, by a workbook manager 208 on a client computing system 204, an input table in a cloud-based data warehouse 202, wherein the input table is presented in an exploration mode that displays edits to the input table without altering the input table in the cloud-based data warehouse 202. The input table is a table on the cloud-based data warehouse 202 requested by a user of the client computing system 204. The input table may be any table on the cloud-based data warehouse 202 created by the user and/or the workbook manager 208 and which the user and/or the workbook manager 208 the has authorization to edit. The input table may also be a table that the user and/or the workbook manager 208 does not have authorization to edit or does not desire to edit. The input table may include any number of columns and rows. When presented on the GUI 214 on the client computing system 204, only a portion of the columns and rows of the input table may be displayed while others are hidden and not presented.

The exploration mode is a mode of interacting with the input table in which changes made to the input table are displayed but not saved or committed to the underlying input table in the cloud-based data warehouse 202. In other words, in the exploration mode, changes made to the input table are transient in that they are not stored or reflected in the underlying data of the input table in the cloud-based data warehouse 202. As will be addressed in further detail below, in some embodiments, the changes to the input table are discarded in response to the closure of a workbook or other user interface presenting the input table. In some embodiments, data describing the changes to the input table made during the exploration mode may be stored such that the changes may be reflected in subsequent accesses of the input table in exploration mode, or in accesses of the input table by other users in exploration mode. Interacting with an input table in exploration mode may be performed for a variety of purposes. For example, a user may wish to change one or more values in the input table to see how other values calculated based on the changed values are affected. As another example, a user may wish to change one or more values in the input table to see how visualizations, graphs, or other workbook elements based on the input table are affected.

The method of FIG. 4 also includes receiving 404, by the workbook manager 208, a change to the input table 420. The change to the input table 420 may be performed by an interaction with the input table as presented on the client computing system 204, such as by a workbook client 212. In some embodiments, the change to the input table 420 may include a modification of one or more values of the input table, removal of one or more values from the input table, addition of one or more values to the input table (e.g., to an empty or null field), and the like. For example, a cell in a spreadsheet structure may be selected and have its value modified, deleted, added, etc. In some embodiments, the change to the input table 420 may include addition or removal of one or more records, rows, or columns from the input table.

In some embodiments, the change to the input table 420 may be received 404 as a database statement such as an SQL statement. For example, in response to a change to the input table 420 via a presentation of the input table, the workbook client 212 may generate a database statement reflecting the change to the input table 420 and provide that database statement to the workbook manager 208. In some embodiments, the change to the input table 420 may be encoded according to other approaches by the workbook client 212 and provided to the workbook manager 208. For example, the change to the input table 420 may be encoded as a state specification.

The method of FIG. 4 also includes modifying 406, by the workbook manager 208, a presentation of the input table reflecting the change without modifying the input table in the cloud-based data warehouse 202. For example, modifying 406 the presentation of the input table may include refreshing or updating a GUI 214 on the client computing system 204 to display a version of the input table that reflects the change. In embodiments where a workbook, graph, or other visualization based on the input table is presented, these workbooks, graphs, or visualizations may also be updated to reflect the input table as changed.

In some embodiments, the workbook manager 208 may store a temporary instance of the input table in order to present 402 the input table in the exploration mode. Changes to the input table 420 may then be applied to this temporary instance of the input table, with the client computing system 204 presenting the temporary instance of the input table. For example, the workbook manager 208 may process, as the change to the input table 420, database statements from the client computing system 204 in order to update the temporary instance of the input table. As another example, the workbook manager 208 may convert changes to the input table 420 encoded according to other approaches, such as state specifications, into database statements that, when processed, update the temporary instance of the input table to reflect the change to the input table 420.

In some embodiments, the workbook manager 208 may present 402 the input table by periodically querying a cloud-based data warehouse 202 for the input table and presenting results of the query. For example, where the input table may be subject to live updates or modifications (e.g., by other users not in the exploration mode), the cloud-based data warehouse 202 may be periodically queried for the latest version of the input table. The workbook manager 208 may then apply, to the latest version of the input table, any changes to the input table 420 received during the exploration mode. For example, changes to the input table 420 may be stored by the workbook manager 208 as a sequence of database statements (e.g., either received from the client computing system 204 or generated based on other data encoding changes to the input table 420). After querying the cloud-based data warehouse 202 for the latest version of the input table, the stored sequence of database statements may then be applied to the received version of the input table such that the latest version of the input table reflecting any changes to the input table 420 from the client computing system 204 may be presented. In some embodiments, where a temporary instance of the input table 420 is stored for modification, changes to the input table in the cloud-based data warehouse 202 may cause notifications to be sent to the workbook manager 208 indicating that a change to the underlying input table has occurred. Such notifications may include database statements or state specifications reflecting these changes to the underlying input table. The workbook manager 208 may then update the temporary instance of the input table to reflect changes to the input table as stored in the cloud-based data warehouse 202.

Figure 5:
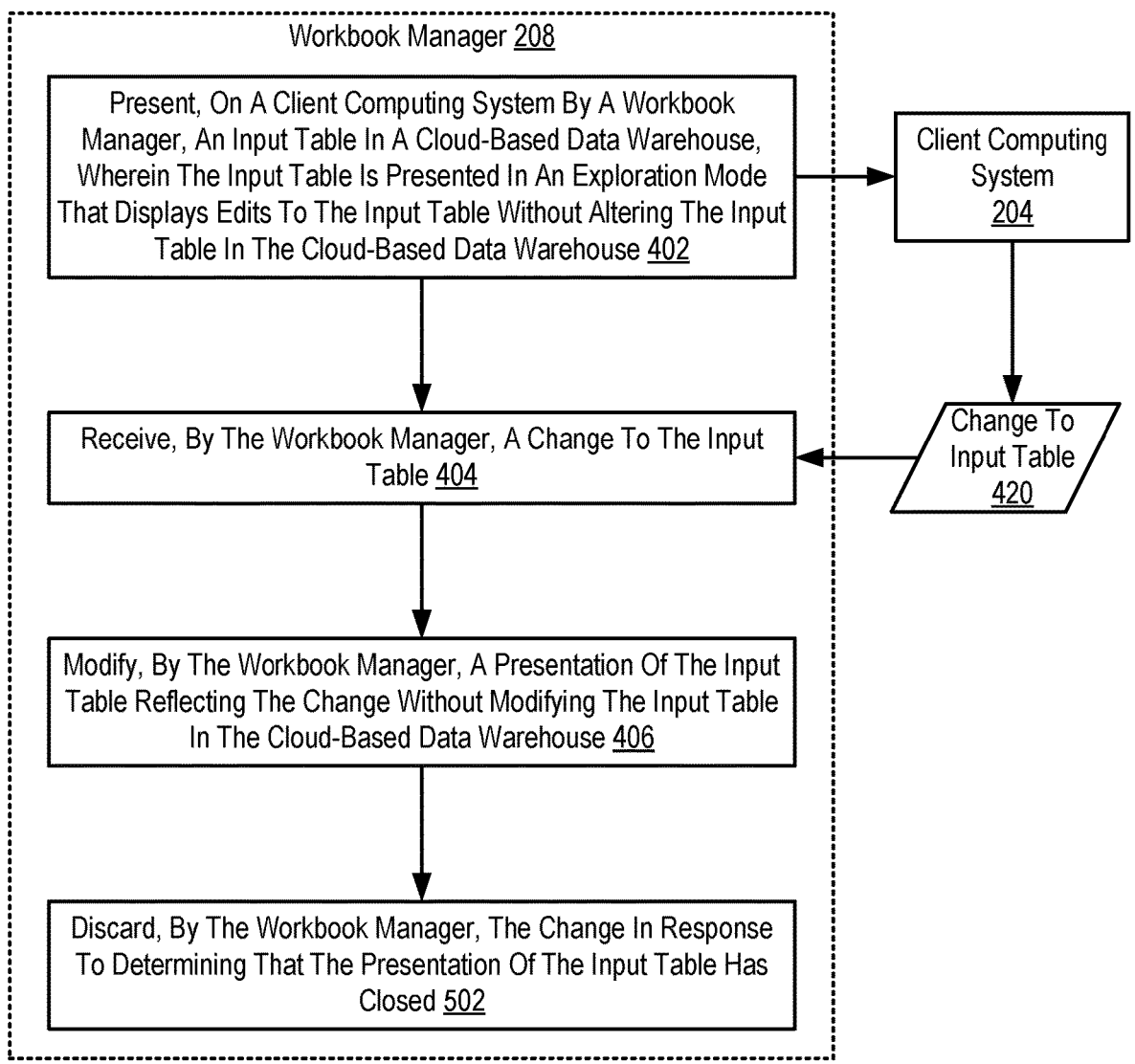
FIG. 5 sets forth a flow chart illustrating an exemplary method for transient exploratory editing of input tables on a data warehouse according to embodiments of the present invention.

For further explanation, FIG. 5 sets forth a flow chart illustrating a further exemplary method for transient exploratory editing of input tables on a data warehouse according to embodiments of the present invention that includes presenting 402, by a workbook manager 208 on a client computing system 204, an input table in a cloud-based data warehouse 202, wherein the input table is presented in an exploration mode that displays edits to the input table without altering the input table in the cloud-based data warehouse 202; receiving 404, by the workbook manager 208, a change to the input table 420; and modifying 406, by the workbook manager 208, a presentation of the input table reflecting the change without modifying the input table in the cloud-based data warehouse 202.

The method of FIG. 5 differs from the method of FIG. 4, however, in that the method of FIG. 5 also includes discarding 502, by the workbook manager 208, the change in response to determining that the presentation of the input table has closed. For example, the workbook manager 208 may receive an indication from the client computing system 204 that the presentation of the input table should close. Such an indication may be provided in response to selection of some user interface element for closing presentation of the input table, such as a "close" button. Such an indication may also be provided in response to closing a workbook client 212 on the client computing system 204.

In some embodiments, discarding 502 the change may include deleting a temporary instance of the input table reflecting the change. In some embodiments, discarding 502 the change may include deleting data describing changes to the input table 420, including stored database statements corresponding to changes to the input table 420. By discarding 502 the change in response to determining that the presentation of the input table has closed, changes made to the input table during exploration mode only persist during a particular session with the workbook manager 208 by the client computing system 204. Thus, should the input table be subsequently accessed in exploration mode, the input table would not reflect any changes previously performed in exploration mode.

Figure 6:
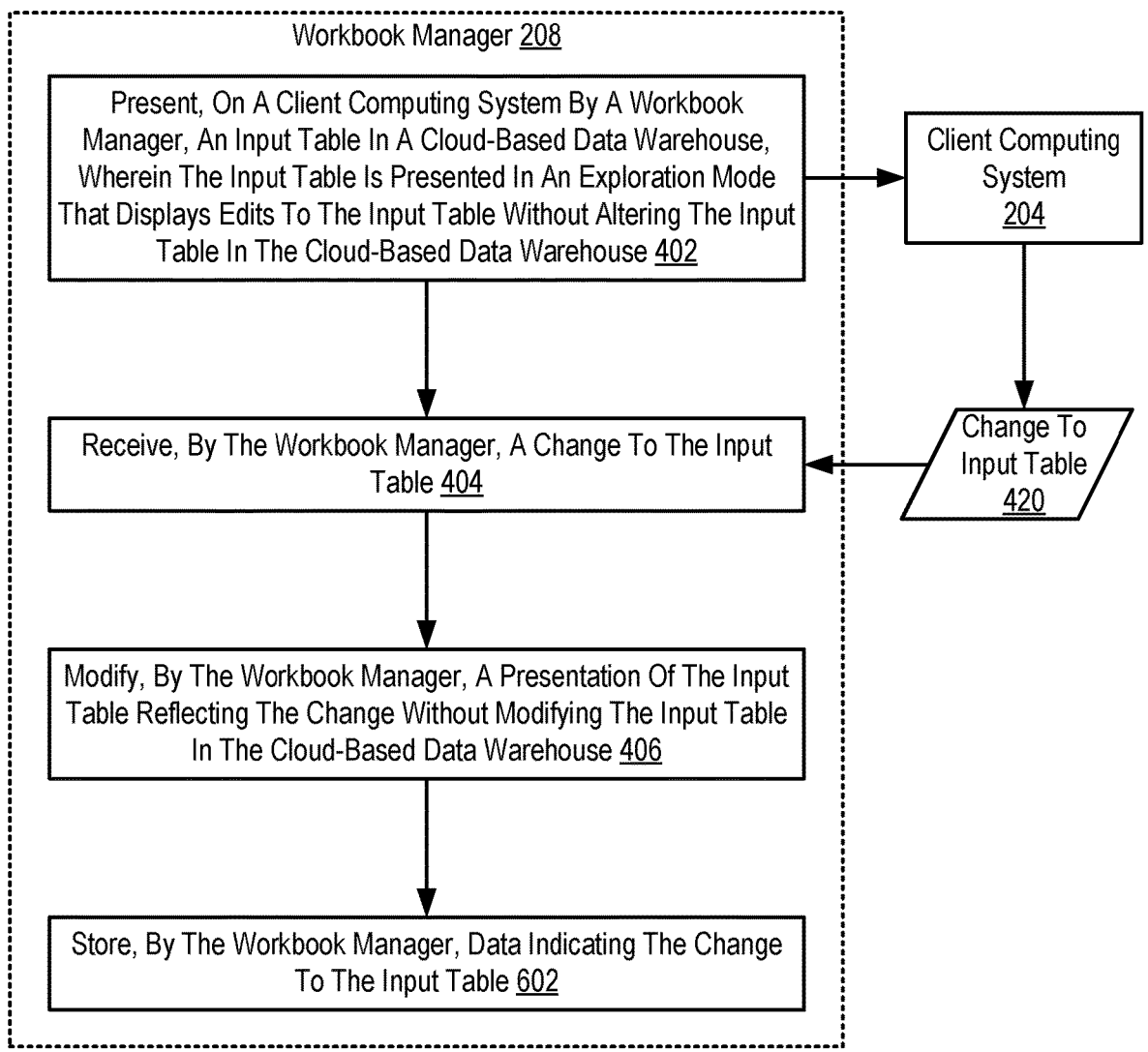
FIG. 6 sets forth a flow chart illustrating an exemplary method for transient exploratory editing of input tables on a data warehouse according to embodiments of the present invention.

For further explanation, FIG. 6 sets forth a flow chart illustrating a further exemplary method for transient exploratory editing of input tables on a data warehouse according to embodiments of the present invention that includes presenting 402, by a workbook manager 208 on a client computing system 204, an input table in a cloud-based data warehouse 202, wherein the input table is presented in an exploration mode that displays edits to the input table without altering the input table in the cloud-based data warehouse 202; receiving 404, by the workbook manager 208, a change to the input table 420; and modifying 406, by the workbook manager 208, a presentation of the input table reflecting the change without modifying the input table in the cloud-based data warehouse 202.

The method of FIG. 6 differs from the method of FIG. 4, however, in that the method of FIG. 6 also includes storing 602, by the workbook manager 208, data indicating the change to the input table. In some embodiments, the data indicating the change to the input table may include a saved version of the temporary instance of the input table to which changes during exploration mode were applied. In such embodiments, this saved version of the temporary instance of the input table would still not overwrite or modify the input table as stored in the cloud-based data warehouse 202. In some embodiments, the data indicating the change to the input table may include one or more database statements, one or more state specifications, or other data describing particular changes to the input table made during exploration mode.

In some embodiments, storing 602 the data indicating the change to the input table may include storing the data in a browser cache or other memory location on the client computing system 204. As will be described in further detail below, this data may be loaded in response to a subsequent access of the input table in exploration mode. This allows the client computing system 204 to interact with the input table in exploration mode in subsequent sessions using the previously performed changes.

In some embodiments, storing 602 the data indicating the change to the input table may include storing the data indicating the change in the cloud-based data warehouse 202. By storing the data in the cloud-based data warehouse 202, the input table may reflect previously performed changes in subsequent accesses of the input table in exploration mode. This may allow changes to the input table 420 in exploration mode to be preserved longer than if stored in a browser cache or other memory location of the client computing system 204.

In some embodiments, storing the data in the cloud-based data warehouse may allow other users or client computing systems 204 to access the input table in exploration mode, with their presentation reflecting the changes in the stored data indicated in the stored data. In other words, storing the data indicating the change to the input table in the cloud-based data warehouse 202 facilitates presentation of the input table in the exploration mode and reflecting the change to the input table on one or more other client computing systems 204. Thus, multiple client computing systems 204 may each access the input table in exploration mode, with each presentation of the input table in exploration mode reflecting the changes provided by each of the client computing systems 204.

Storing 602 the data indicating the change to the input table 420 may be performed in response to a variety of events. For example, the data may be periodically stored at a predefined time interval or after each change to the input table 420 as part of an auto-save feature. As another example, the data may be stored in response to determining that the presentation of the input table has closed. As a further example, the data may be stored in response to an indication from the client computing system 204 that the data should be saved, such as the selection of a "save" button or another user interface element.

Figure 7:
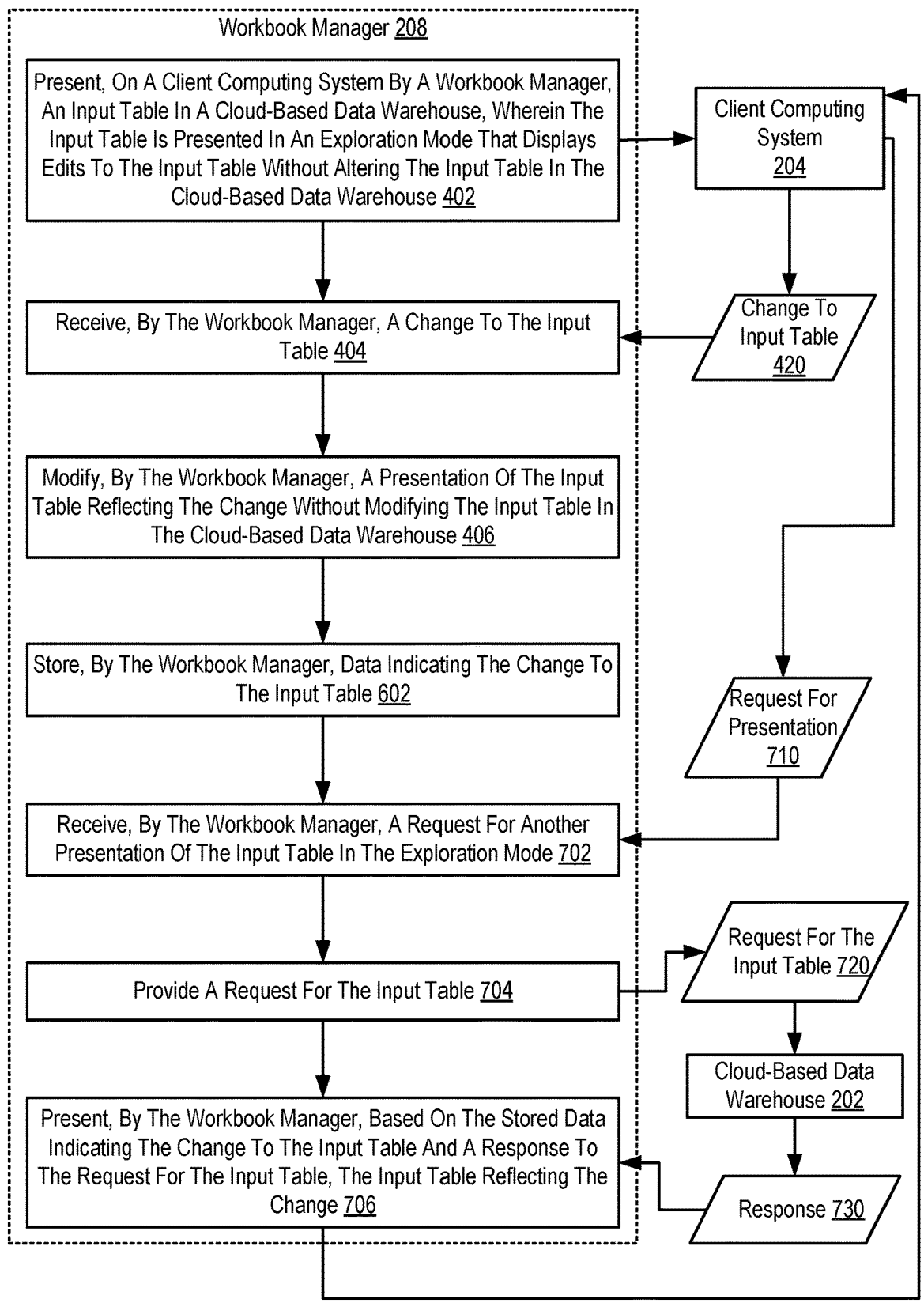
FIG. 7 sets forth a flow chart illustrating an exemplary method for transient exploratory editing of input tables on a data warehouse according to embodiments of the present invention.

For further explanation, FIG. 7 sets forth a flow chart illustrating a further exemplary method for transient exploratory editing of input tables on a data warehouse according to embodiments of the present invention that includes presenting 402, by a workbook manager 208 on a client computing system 204, an input table in a cloud-based data warehouse 202, wherein the input table is presented in an exploration mode that displays edits to the input table without altering the input table in the cloud-based data warehouse 202; receiving 404, by the workbook manager 208, a change to the input table 420; modifying 406, by the workbook manager 208, a presentation of the input table reflecting the change without modifying the input table in the cloud-based data warehouse 202; and storing 602, by the workbook manager 208, data indicating the change to the input table.

The method of FIG. 7 differs from the method of FIG. 6, however, in that the method of FIG. 7 also includes receiving 702, by the workbook manager 208, a request for another presentation of the input table (shown as request for presentation 710) in the exploration mode. The request for presentation 710 may be received 702 from the client computing system 204 after closing a prior presentation of the input table in the exploration mode. The request for presentation 710 may be generated by a workbook client 212 on the client computing system 204 in response to a request or indication to access a workbook associated with the input table, or in response to a request to open another user interface for presenting the input table in the exploration mode.

The method of FIG. 7 also includes providing 704 a request for the input table 720. The request for the input table 720 may include a database statement such as an SQL query to load the input table from the cloud-based data warehouse. The input table may then be received by the workbook manager as a response to the database statement.

The method of FIG. 7 also includes presenting 706, by the workbook manager 208, based on the stored data indicating the change to the input table and a response 730 to the request for the input table 720, the input table reflecting the change. The input table reflecting the change is presented 706 in the exploration mode such that any received changes do not alter the input table in the cloud-based data warehouse 202. In order for the presented 706 input table to reflect the change, the stored data indicating the change is used with the input table as stored in the data warehouse 202 to generate a version of the input table reflecting the change. Where multiple changes had been previously applied to the input table in exploration mode, the presented 706 input table will reflect each of these changes based on stored data indicating these changes.

In some embodiments, presenting 706 the input table reflecting the change may include loading the stored data indicating the change (e.g., from the cloud-based data warehouse 202 or from a browser cache or memory of the client computing system 204). In some embodiments, the warehouse manager 208 may generate the request for the input table 720 by inserting or injecting database statements into the request for the input table 720 based on the stored data indicating the change. The response 730 may then include the input table modified according to the inserted database statements so as to reflect the change. The response 730 may then be presented 706 as the input table reflecting the change.

In some embodiments, the request for the input table 720 may indicate that the input table is to be presented in exploration mode. In response to an indication that the input table is to be presented in exploration mode, assuming that the data indicating the change is stored in the cloud-based data warehouse 202, the cloud-based data warehouse may load this stored data and generate a database statement for the input table that includes inserted database statements for the change. The result of the database statement will then reflect the change by virtue of the inserted database statements. In other embodiments, the cloud-based data warehouse 202 may issue a database statement for the input table and then modify a received response based on the stored data indicating the change before providing the response 730 to the warehouse manager 208.

In some embodiments, the received response 730 may correspond to the input table as stored in the cloud-based data warehouse 202 (e.g., independent of any previous changes made during exploration mode). In such embodiments, the warehouse manager 208 may modify the response (e.g., the received instance of the input table) based on the stored data indicating the change. For example, the warehouse manager 208 may store the response 730 as a temporary instance of the input table and update this temporary instance to reflect the change based on the stored data, such as by applying one or more database statements indicated in the stored data to the temporary instance of the input table.

Although the flowchart of FIG. 7 shows the request for presentation 710 as being received from the client computing system 204 that previously provided the change in exploration mode, the approaches described herein are applicable to requests for presentation 710 received from other client computing systems 204. Thus, multiple users may access the input table in the exploration mode and, using stored data describing changes to the input table, have their respective changes reflected in the presentations of the input table for each other user.

In view of the explanations set forth above, readers will recognize that the benefits of transient exploratory editing of input tables on a data warehouse according to embodiments of the present invention include:
Improving the operation of the computer system by enabling interactions with an input table without modifying the underlying data, increasing system utility.

Exemplary embodiments of the present invention are described largely in the context of a fully functional computer system for transient exploratory editing of input tables on a data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for transient exploratory editing of input tables on a data warehouse, the method comprising:
    presenting, on a client computing system by a workbook manager, an input table in a cloud-based data warehouse, wherein the input table is presented in an exploration mode that displays edits to the input table without altering the input table in the cloud-based data warehouse;
    receiving, by the workbook manager, a change to the input table;
    modifying, by the workbook manager, a presentation of the input table reflecting the change without modifying the input table in the cloud-based data warehouse, wherein the modification is applied to a temporary instance of the input table stored locally to the workbook manager;
    querying, periodically by the workbook manager, the cloud-based data warehouse for updates to the input table; and
    applying, by the workbook manager, detected updates to the input table, wherein the detect updates are presented in the presentation of the input table reflecting the change received in the exploration mode, and wherein the detected updates are made to the input table stored locally to the workbook manager.

2. The method of claim 1, further comprising discarding, by the workbook manager, the change in response to determining that the presentation of the input table is closed.

3. The method of claim 1, further comprising storing, by the workbook manager, data indicating the change to the input table.

4. The method of claim 3, wherein the data indicating the change to the input table is stored in the client computing system.

5. The method of claim 3, wherein the data indicating the change to the input table is stored in the cloud-based data warehouse.

6. The method of claim 3, further comprising:
    receiving, by the workbook manager, a request for another presentation of the input table in the exploration mode;
    providing a request for the input table; and
    presenting, by the workbook manager, based on the stored data indicating the change to the input table and a response to the request for the input table, the input table reflecting the change.

7. The method of claim 3, wherein the data indicating the change to the input table comprises a database statement.

8. The method of claim 7, wherein the database statement comprises a structured query language (SQL) statement.

9. The method of claim 5, wherein storing the data indicating the change to the input table in the cloud-based data warehouse facilitates presentation of the input table in the exploration mode and reflecting the change to the input table on one or more other client computing systems.

10. An apparatus for transient exploratory editing of input tables on a data warehouse, the apparatus comprising a computer processor, a computer memory operatively coupled to the computer processor, the computer memory having disposed within it computer program instructions that, when executed by the computer processor, cause the apparatus to carry out the steps of:
    presenting, on a client computing system by a workbook manager, an input table in a cloud-based data warehouse, wherein the input table is presented in an exploration mode that displays edits to the input table without altering the input table in the cloud-based data warehouse;
    receiving, by the workbook manager, a change to the input table;
    modifying, by the workbook manager, a presentation of the input table reflecting the change without modifying the input table in the cloud-based data warehouse, wherein the modification is applied to a temporary instance of the input table stored locally to the workbook manager;

querying, periodically by the workbook manager, the cloud-based data warehouse for updates to the input table; and applying, by the workbook manager, detected updates to the input table, wherein the detect updates are presented in the presentation of the input table reflecting the change received in the exploration mode, and wherein the detected updates are made to the input table stored locally to the workbook manager.

11. The apparatus of claim 10, wherein the computer program instructions further cause the apparatus to carry out the step of discarding, by the workbook manager, the change in response to determining that the presentation of the input table is closed.

12. The apparatus of claim 10, wherein the computer program instructions further cause the apparatus to carry out the step of storing, by the workbook manager, data indicating the change to the input table.

13. The apparatus of claim 12, wherein the data indicating the change to the input table is stored in the client computing system.

14. The apparatus of claim 12, wherein the data indicating the change to the input table is stored in the cloud-based data warehouse.

15. The apparatus of claim 12, wherein the computer program instructions further cause the apparatus to carry out the steps of:

receiving, by the workbook manager, a request for another presentation of the input table in the exploration mode;

providing a request for the input table; and presenting, by the workbook manager, based on the stored data indicating the change to the input table and a response to the request for the input table, the input table reflecting the change.

16. The apparatus of claim 12, wherein the data indicating the change to the input table comprises a database statement.

17. The apparatus of claim 16, wherein the database statement comprises a structured query language (SQL) statement.

18. The apparatus of claim 14, wherein storing the data indicating the change to the input table in the cloud-based data warehouse facilitates presentation of the input table in the exploration mode and reflecting the change to the input table on one or more other client computing systems.

19. A computer program product for transient exploratory editing of input tables on a data warehouse, the computer program product disposed upon a non-transitory computer readable medium, the computer program product comprising computer program instructions that, when executed, cause a computer to carry out the steps of:

presenting, on a client computing system by a workbook manager, an input table in a cloud-based data warehouse, wherein the input table is presented in an exploration mode that displays edits to the input table without altering the input table in the cloud-based data warehouse;

receiving, by the workbook manager, a change to the input table;

modifying, by the workbook manager, a presentation of the input table reflecting the change without modifying the input table in the cloud-based data warehouse, wherein the modification is applied to a temporary instance of the input table stored locally to the workbook manager;

querying, periodically by the workbook manager, the cloud-based data warehouse for updates to the input table; and applying, by the workbook manager, detected updates to the input table, wherein the detect updates are presented in the presentation of the input table reflecting the change received in the exploration mode, and wherein the detected updates are made to the input table stored locally to the workbook manager.

20. The computer program product of claim 19, wherein the computer program instructions further cause the computer to carry out the step of discarding, by the workbook manager, the change in response to determining that the presentation of the input table is closed.

* * * * *